United States Patent [19]

Furukawa et al.

[11] Patent Number: 4,789,710

[45] Date of Patent: Dec. 6, 1988

[54] PROCESS FOR PREPARATION OF A ROOM-TEMPERATURE CURABLE RESIN

[75] Inventors: Hisao Furukawa; Jo Kawamura, both of Hyogo, Japan

[73] Assignee: Kanegafuchi Kagaku Kogyo Kabushiki Kaisha, Osaka, Japan

[21] Appl. No.: 135,408

[22] Filed: Dec. 21, 1987

[30] Foreign Application Priority Data

Dec. 22, 1986 [JP] Japan ................................ 61-306049

[51] Int. Cl.$^4$ ............................................. C08G 18/61
[52] U.S. Cl. .................................... 525/440; 525/446; 525/453; 525/457; 525/477; 525/523; 528/26; 556/413; 556/418; 556/423; 556/424
[58] Field of Search ............... 525/440, 446, 453, 457, 525/477, 523; 528/26; 556/413, 418, 423, 424

[56] References Cited

U.S. PATENT DOCUMENTS 3,632,557  1/1972  Brode et al. ........................... 528/28

Primary Examiner—Maurice J. Welsh
Attorney, Agent, or Firm—Armstrong, Nikaido, Marmelstein & Kubovcik

[57] ABSTRACT

A process for the preparation of a room-temperature curable resin comprises reacting a compound (A) containing at least two acryloyl groups and/or methacryloyl groups in a molecule, and having from 100 to 100,000 of number-average molecular weight, with an aminosilane compound (B) represented by formula,

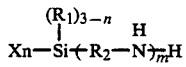

(wherein X is a hydrolyzable group selected from the group consisting of halogen, alkoxy, acryloxy, ketoxymate, amino, acid amide, aminoxy, mercapto, alkenyloxy groups; $R_1$ is $C_1$–$C_{10}$ alkyl group, aryl group, or aralkyl group; n is an integer of from 1 to 3, and m is an integer of from 1 to 10), at the ratio of at least 0.2 equivalents of primary amino groups contained in the compound (B) to equivalent of acryloyl groups and/or methacryloyl groups contained in the compound (A), under substantially water-free condition, subsequently reacting the reaction product of aminosilane-modified resin and, furtherwith a monofunctional isocyanate compound (C) represented by formula,

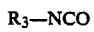

(wherein $R_3$ is a $C_1$–$C_{25}$ alkyl group, aryl group, aralkyl group, $(C_2H_5O)_3Si—CH_2)_3$ or $(CH_3O)_3Si—CH_2)_3$)

at the ratio of from 0.9 to 1.5 equivalents to equivalent of active hydrogen of amino groups contained in the aminosilane-modified resin, and under substantially water-free condition to obtain a room-temperature curable resin having 2 mg KOH or lower of an amine value.

9 Claims, No Drawings

PROCESS FOR PREPARATION OF A ROOM-TEMPERATURE CURABLE RESIN

FIELD OF THE INVENTION

The present invention relates to a process for the production of a room-temperature curable resin having a hydrolyzable silyl group as a terminal group. More particularly it provides a room-temperature curable resin which is excellent in flexibility, solvent resistance and adhesive properties to organic substances, and is useful as a base resin for coatings, adhesives, pressure-sensitive adhesives, sealing agents, and potting agents, and further as a blend with cellulose of nitrocellulose, cellulose acetate butylate, and with polyester, alkyd, and acryl, and in addition as a blend resin with a vinyl resin containing a hydrolyzable silyl group (for example, refer to Japanese Patent Application (OPI) No. 54-36395) (a term (OPI) herein means unexamined Japanese Patent Application).

PRIOR ART

The present inventors found that aminosilane-modified resin can provide a curable resin excellent in room-temperature curable properties, flexibility, solvent resistance, and adhesiveness to organic substances, and they filed a patent application (Japanese Patent Application (OPI) No. 60-197733) with the Japanese Patent Office.

Aminosilane-modified resin, however, is not necessarily satisfactory, in spite of the aforesaid features, in points of weather yellow-discoloration and shelf-stability (particularly in case of water contamination).

The present inventors continued their assiduous study to improve the aforesaid undesirable properties, and found that the weather yellow-discoloration and shelf-stability can be improved to a great extent by capping the active hydrogen of an amino group of aminosilane-modified resin with a monofunctional isocyanate compound to introduce N,N,N'-trisubstituted urea, without deteriorating the effects of flexibility, solvent resistance, and adhesiveness to organic substances, and they have accomplished the present invention.

Nonetheless a room-temperature curable resin according to the present invention contains an urea bond having a high aggregation property, the resin is characterized by showing a low viscosity and having high compatibility with other resins. Since a polyester resin containing a hydrolyzable silyl group as disclosed in Japanese Patent Publication No. 30711/71 (corresponding to U.S. Ser. No. 623,532 filed Mar. 16, 1967, and now abandoned) contains N,N'-disubstituted urea group having high aggregation property, in a main chain, the polyester resin is expected to be improved in both flexibility and anti-solubility. However, it is assumed that due to a property in a high aggreation of N,N'-substituted urea bond in a main chain, the polyester resin shows a drawback such as high viscosity and low compatibility with other resins.

The room-temperature curable resin of the present invention may be effectively used as a paint component for repairing an automobile body in view of its room-temperature curability and high solvent resistance, and effectively used as a paint for coating new automobile which is earnestly required so called high solidification in view of a low viscosity thereof.

SUMMARY OF THE INVENTION

According to the present invention there is to provide a process for the preparation of a room-temperature curable resin which comprises reacting a compound (A) containing at least two acryloyl groups and/or methacryloyl groups (hereinafter referred to as (meth)acryloyl groups) in a molecule, and having from 100 to 100,000 of number-average molecular weight, with aminosilane compound (B) represented by formula,

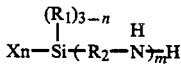

(wherein X is a hydrolyzable group selected from the group consisting of halogen, alkoxy, acryloxy, ketoxymate, amino, acid amide, aminoxy, mercapto, alkenyloxy groups; $R_1$ is a $C_1$–$C_{10}$ alkyl group, aryl group, or aralkyl group; $R_2$ is a $C_1$–$C_{10}$ bivalent alkyl group, aryl group, or aralkyl group; n is an integer of 1 to 3, m is an integer of 1 to 10), at the reaction ratio of at least 0.2 equivalents of primary amino groups contained in the compound (B) to equivalent of (meth)acryloly groups contained in the compound (A), and under substantially water-free condition, subsequently further reacting the reaction product of aminosilane-modified resin with a monofunctional isocyanate compound (C) represented by formula,

(wherein $R_3$ is a $C_1$–$C_{25}$ alkyl group, aryl group, aralkyl group $(C_2H_5O)_3Si\text{-}(CH_2)_3$, $(CH_3O)_3Si\text{-}(CH_2)_3$)
at the reaction ratio of 0.9–1.5 equivalents to equivalent of active hydrogen of amino groups contained in the aminosilane-modified resin, and under substantially water-free condition to obtain a room-temperature curable resin having 2 mg KOH or lower of an amine value.

DETAILED DESCRIPTION OF THE INVENTION

As (meth)acryloyl-group-containing compound (A) employed in the present invention, there is no particular restriction, so long as it is a compound containing at least two (meth)acryloyl groups in a molecule, and having 100–100,000 of number-average molecular weight. As typical ones of such, the following compounds may be included:

(1) Polyfunctional (meth)acrylates, such as ethylene glycol-di(meth)acrylate, trimethylolpropane-tri(meth)acrylate, etc., (2) polyalcohols, such as ethylene glycol, propylene glycol, glycerin, trimethylol, propane, etc., polyfunctional carboxylic acids, such as phthalic acid, trimellitic acid, etc., and polyester-(meth)acrylate obtained by polycondensation with (meth)acrylic acid (as such polyester(meth)acrylate, there are, for example, ARONIX M-6100, M-6200, M 6400X, M 6420X, M-6300, M-7100, M 8030, M-8100, produced by Toagosei Chemical Industry Co., Ltd.), (3) polyurethane(meth)acrylate obtained by addition of a hydroxyl-group-containing (meth)acrylate, such as 2-hydroxyethyl(meth)acrylate to a polyfunctional isocyanate compound, such as tolylene-diisocyanate, diphenylmethane-4,4'-diisocyanate, hexamethylene-diisocyate, xylene-diisocyanate, isophorone-diisocyanate,

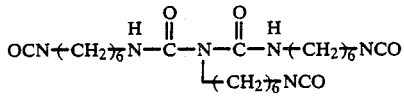

(4) polyurethane(meth)acrylate obtained by addition of a hydroxyl-group-containing (meth)acrylate, such as 2-hydroxy(meth)acrylate,

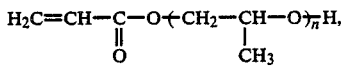

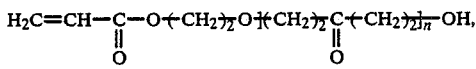

etc., to an isocyanate-group-containing polyurethane resin which is obtained by polyaddition of a polyalcohol, such as ethylene glycol, trimethylolpropane, polyester polyol, polyether polyol, etc., to a polyfunctional isocyanate, such as tolylene diisocyanate, diphenylmethane-4,4'-diisocyanate, hexamethylene-diisocyanate, xylene-diisocyanate, isophorone-diisocyanate,

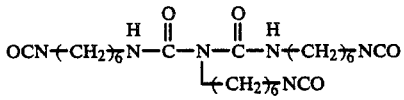

(as such polyurethane(meth)acrylates, for example, ARONIX M-1100, M-1200, products of Toagosei Chemical Industry Co., Ltd., and VISCOTE 813 and 823, products of Osaka Organic Chemistry Co., Ltd. may be mentioned).

(5) polyesterurethane-(meth)acrylate (I) obtained by addition of hydroxyl-group-containing polyester(meth)acrylate (I) (for example, Placcel FM-1, FM-4, FM-8, FA-1, FA-4, FA-8, products of Daisel Ltd., and TONE M-100, a product of Union Carbide Corp.) obtained by ring-opening polymerization of ε-caprolactone in the presence of hydroxyl-group-containing (meth)acrylate such as 2-hydroxyethyl(meth)acrylate, and catalysts, such as organic titanate, tinchloride, or perchloro acid, to a polyfunctional isocyanate compound such as tolylenediisocyanate diphenylmethane-4,4'-diisocyanate, hyxamethylene-diisocyanate, xylylene-diisocyanate, isophorone diisocyanate,

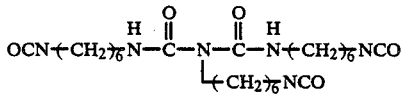

(6) polyesterurethane-(meth)acrylate which is obtained by addition of hydroxyl-group-containing polyester-(meth)acrylate (I) to isocyanate-group-containing-polyurethane resin obtained by polyaddition of a polyalcohol, such as ethylene glycol, dimethylolpropionic acid, 1,10-decame diol, trimethylolpropane, polyether polyol, polycaprolactone (for example, Placcel 205k 212, 220, 308, 312, 320, 212 AL, 220 N, 220 AL, products of Daisel Ltd.) or alcohol-modified silicone oil (for example, F-99-199, F-99-258, products of Japan Unicar Co., Ltd.) to polyfunctional isocyanate, such as tolylene diisocyanate, diphenylmethane-4,4'-diisocyanate, hexamethylene diisocyanate, xylylene diisocyanate, isophorone diisocyanate,

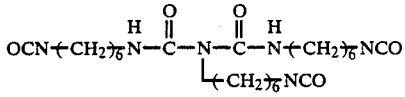

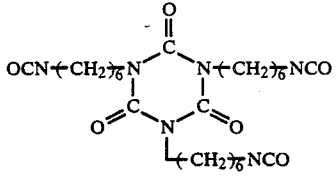

(7) polyether(meth)acrylate (for example, 14 EG-A, product of Kyoeisha Yushi Co., Ltd.) obtained by condensation of polyethylene glycol, or polypropylene glycol and (meth)acrylic acid, (8) epoxy(meth)acrylate (for example, VISCOTE 540, product of Osaka Organic Chemistry Co., Ltd.) obtained by reacting epoxy resin, (for example, EPICOTE 828, product of Yuka Shell Co., Ltd.) with (meth)acrylic acid, or hydroxyl-group-containing (meth)acrylate, and (9) silicone(meth)acrylate obtained by condensating silanol-group-containing silicone oil and (meth)acrylate containing a hydrolyzable-silyl-group, such as γ-(meth)acryloxy-propyltrimethoxysilane, etc.

If the compound (A) is required to be improved in an aggregation property to a room-temperature curable resin, a polyurethane acrylate is preferably used.

As compounds (B) employed in the present invention, there are aminosilane compounds, such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, $H_2NCH_2CH_2NHCH_2CH_2NHCH_2CH_2CH_2Si(OMe)_3$, $H_2NCH_2CH_2NHCH_2CH_2NHCH_2CH_2CH_2Si(OEt)_3$.

And further, some of mercaptosilane compounds, such as γ-mercaptopropyltrimethoxysilane may also be employed combinedly.

In order to obtain desired aminosilane-modified resin from (meth)acryloyl-group-containing compounds (A) and aminosilane compound (B), (A) and (B) are mixed to be reacted substantially under water-free condition, at a temperature of from normal temperature to 200° C.

This reaction is so-called "michael Addition," and if it is desired to employ only primary amine selectively for the reaction, it is preferable to add compound (A) to compound (B). And for the purpose of inhibiting radical polymerization in the reaction of (meth)acryloyl group of compound (A), it is preferable that polymerization inhibitors, such as hydroquinone, benzoquinone, 2,5-di-t-butylbenzoquinone, phenothiazine, hydroquinone-monomethylether and 2,6-di-t-butyl-4-methylphenol (BHT) be added prior to the reaction. Among the above polymerization inhibitors hydroquinone-monomethylether or BHT is preferable in view of the tinting. The reaction proceeds even without catalysts, but catalysts to promote the addition reaction may also be employed, and as such catalysts may be mentioned, for example, tertiary amines, such as dimethylbenzylamine, 2,4,6-tris(dimethylaminoethyl)phenol, quaternary ammonium salts, such as benzyl-trimethylammonium hydroxide, and alkalis, such as sodium methoxide.

Ratio of component (B) to component (A) in the reaction is from 0.2 to 20, preferably from 0.8 to 10 equivalents of primary amino group contained in compound (B) per equivalent of (meth)acryloyl group contained in compound (A). If the equivalent ratio is less than 0.2, effects of the present invention, for example, the effect of improving adhesiveness to organic substances will be small. And if the above ratio exceeds 20 equivalents, it is undesirable in view of the cost, although no problem is caused thereby in the process of synthesis or in the properties of the resin.

In carrying out the reaction, use of solvent is unnecessary, but if it facilitates the reaction, solvents may also be used. And as such solvents, toluene, xylene, butyl acetate may be included.

As monofunctional isocyanates (C) to be reacted with amino groups of the aminosilane-modified resin obtained in the reaction, the following compounds may be mentioned specifically; methyl isocyanate, ethyl isocyanate, butyl isocyanate, hexyl isocyanate, cyclohexyl isocyanate, phenyl isocyanate, benzyl isocyanate, stearyl isocyanate, γ-isocyanate-propyltriethoxysilane, γ-isocyanate-propyltrimethoxysilane, γ-isocyanate-propyltrimethoxysilane, etc.

The reaction proceeds readily attended by exothermic heat just by adding monofunctional isocyanate (C) to aminosilane-modified resin or a solution thereof at a temperature of from ordinary temperature, for example, room-temperature, to 60° C. The ratio of reaction component (C) in the reaction is from 0.9 to 1.5, preferably from 0.95 to 1.2 equivalents, per equivalent of active hydrogen of amino group of aminosilane-modified resin. If the equivalent ratio is less than 0.9, the effect of improving the stability will be small, and if it exceeds 1.5, it is undesirable, because monofunctional isocyanate will remain as excess in the system.

An amine value of the room-temperature curable resin (solids-content concentration, 10.0%) thus obtained, is required to be 2 or less, preferably 1 or less. When the amine value will be over 2, the resin shows less stability, thereby resulting in being liable to gelate thereof.

The amine value is obtained by following equation with a result of neutralization titration.

$$\text{Amine value} = \frac{A \times f \times 1/5 \times 56.108}{S}$$

wherein A represents a consumption of 0.2N ethanol chloric acid solution in ml; f represents potencies of 0.2N ethanol chloric acid solution; and S represents an amount of sample in g.

For stabilization of the room-temperature curable resin according to the present invention, the following compounds may be employed: hydrolyzable esters of methyl orthoformate, ethyl orthoformate, methyl orthoacetate, ethyl orthoacetate, methyltrimethoxysilane, methylsilicate, ethylsilicate, methyltrimethoxysilane, partially hydrolyzed methylsilicate, partially hydrolyzed methyltrimethoxysilane, γ-methacryloxypropyl-trimethoxysilane, vinyltrimethoxysilane, etc.; and alcohols, such as methanol, ethanol, isopropyl alcohol, butyl alcohol, etc.

For setting the room-temperature curable resin obtained according to the present invention, the following hardening catalyst may be employed, i.e. alkyltitanate; organic aluminum compound; acid compounds, such as phosphoric acid, phosphoric ester p-toluenesulfonic acid; amines, such as ethylene diamine, tetraethylenepentamine; organo-tin compounds, such as dibutyltindilaurate, dioctyltin malate; and basic compounds, such as sodium hydroxide, sodium methylate. Amount of the hardening catalyst to be used is from 0.005 to 10, preferably from 0.1 to 8 parts by weight per 100 parts by weight of the room-temperature curable resin.

Thus obtained room-temperature curable resin is improved, as compared with aminosilane-modified resin, in resistance to weather yellow-discoloration, stability (particularly in case of water contamination), and further in solvent resistance due to N,N,N'-trisubstituted urea bond formed in side chains. And as compared with the case of having N,N'-disubstituted urea bonds in the main chain, the room-temperature curable resin has a low viscosity, and a good compatibility with other resin.

The curable resin prepared according to the present invention has a hydrolyzable silyl group as its end group, and is characterized with excellent properties of room-temperature curing, flexibility, solvent resistance, adhesiveness to organic substances, and compatibility, accordingly it is useful as a base resin for coatings, adhesives, pressure-sensitive adhesives, sealing agents, potting agents, etc., and as a blend with polyester, alkyd, acryl or epoxide, cellulose of nitrocellulose, cellulose acetate butylate, and further as a blending resin for hydrolyzable-silyl-group containing vinyl resin (refer, for example, to Japanese Patent Application (OPI) No. 36395/79).

The present invention is illustrated more specifically with reference to the following examples.

EXAMPLE 1

A reactor which is equipped with an agitator, a thermometer, a nitrogen-introduction pipe, a dropping funnel and a cooling pipe was charged with 123.3 g of γ-aminopropyl-triethoxysilane, 75.9 g of γ-mercaptopropyltrimethoxysilane and 100 g of xylene, subsequently therein 361.3 g of ARONIX M6200 (bifunctional oligoesteracrylate, $\overline{Mn}$680, product of Toagosei Chemical Co., Ltd.) was dropped in a nitrogen atmosphere at a temperature of 30° C. over a period of one hour, then the reaction was continued at a temperature of 60° C. for another one hour. The reactor was cooled down to a temperature of 20° C. to give aminosilane-modified resin.

Infrared absorption characteristics were examined on the above obtained silane-modified resin, and a complete disappearance of absorption of 1630, 1410 cm$^{-1}$ by acryloyl group was recognized. Further in the reactor 39.6 g of ethylisocyanate was added dropwise at a temperature of 20° C., and reacted further at a temperature of 60° C. for 30 minutes, subsequently 300 g of xylene was added thereto to give curable resin 1 (solids-content concentration, 60%). In the curable resin, infrared absorption of 1640 cm$^{-1}$ by urea bond was recognized as generated, and its number-average molecular weight calculated by GPC method was 1100, and its amine value was 0.4.

EXAMPLE 2

A reactor which was equipped with an agitator, a thermometer, a nitrogen-introduction pipe and a cooling pipe was charged with 50.8 g of hexamethylenediisocyanate, 346.0 g of Placcel FA 4 (polycaprolactone containing acryloyl groups at both ends, $\overline{Mn}$ 572, product of Daisel Ltd.) and 100 g of xylene, then the reaction was carried out under agitation in a nitrogen gas atmosphere, at a temperature of 90° C. for 2 hours to give polyester-urethane which contains acryloyl groups at both ends (wherein infrared absorption of 2270 cm$^{-1}$ by NCO was recognized as disappeared, but absorption of 1630 to 40$^{-1}$ by acryloyl group remained).

Another reactor which was equipped with an agitator, a thermometer, a nitrogen-introduction pipe, a dropping funnel and a cooling pipe was charged with 140.3 g of γ-aminopropyltriethoxysilane, and the polyester-urethane which contains acryloyl groups at both ends was added thereto continuously under agitation, in a nitrogen gas atmosphere, at a temperature of 30° C. over a period of one hour, and reacted at a temperature of 60° C. for another one hour to give aminosilane-modified resin. As the result of examination of thus obtained resin, infrared absorption of 1630, 1410 cm$^{-1}$ by acryloyl group was recognized as disappeared.

And further, 62.9 g of butyl isocyanate was added dropwise in the reactor at a temperature of 20° C., and reacted at temperature of 60° C. for 30 minutes, subsequently 300 g of xylene was added thereto to give curable resin 2 (solids-content concentration, 60%). In the obtained curable resin, infrared absorption of 1640 cm$^{-1}$ was recognized as generated, and its number-average molecular weight by GPC method was 1800, and its amine value was 0.5.

EXAMPLE 3

A reactor equipped with an agitator, a thermometer, a nitrogen-introduction pipe and a cooling pipe was charged with 75.8 g of isophorne-diisocyanate (IPDI), 209.5 g of Placcel 212 AL (polycaprolactone containing hydroxyl groups at both ends, $\overline{Mn}$ 1260, product of Daisel Ltd.), and 100 g of xylene, and reacted under agitation, in a nitrogen gas atmosphere, at a temperature of 110° C. for 2 hours, subsequently 195.2 g of Placcel FA-4 was added thereto and reacted further at a temperature of 100° C. for another 2 hours to give polyester-urethane which contains acryloyl groups at both ends (wherein infrared absorption of 2270 cm$^{-1}$ by NCO was recognized as disappeared, but absorption of 1630 to 40 cm$^{-1}$ by acryloyl group remained).

Another reactor which was equipped with an agitator, a thermometer, a nitrogen-introduction pipe, a dropping funnel and a cooling pipe was charged with 82.6 g of γ-aminopropyltriethoxysilane, and the above obtained polyesterurethane which contains acryloyl groups at both ends was continuously added thereto, under agitation and in a nitrogen atmosphere at a temperature of 20° C. over a period of one hour, and reacted further at a temperature of 60° C. for another one hour to give aminosilane-modified resin. In the obtained resin, infrared absorption of 1630, 1410 cm$^{-1}$ by acryloyl group was recognized as disappeared.

Further, 37.1 g of butyl isocyanate was dropped in the reactor at a temperature of 20° C., and was reacted at a temperature of 60° C. for 30 minutes, subsequently 300 g of xylene was added thereto to give curable resin 3 (solids-content concentration, 60%). In the obtained curable resin, infrared absorption of 1640 cm$^{-1}$ by urea bond was recognized as generated, and its number-average molecular weight by GPC method was 3500 and its amine value was 0.1.

EXAMPLE 4

A reactor equipped with an agitator, a thermometer, a nitrogen-introduction pipe and a cooling pipe was charged with 114.4 g of F-99-199 (alcohol-modified silicone oil, $\overline{Mn}$ 540, product of Japan Unicar Co., Ltd.), 94.1 g of IPDI and 100 g of xylene, then they were reacted with one another under agitation, in a nitrogen atmosphere, at a temperature of 120° C. for 2 hours, and further thereto 242.4 g of Placcel FA-4 ($\overline{Mn}$ 572) was added, and reacted further at a temperature of 100° C. for another 2 hours to give silicone-polyester which contains acryloyl groups at both end.

In the spectrum examination of the above obtained prepolymer, infrared absorption of 2270 cm$^{-1}$ by NCO was recognized as completely disappeared, but absorption of 1630 to 40 cm$^{-1}$ by acryloyl group was recognized as remained.

Next another reactor equipped with an agitator, a thermometer, a nitrogen-introduction pipe, a cooling pipe and a dropping funnel was charged with 103 g of γ-amino-propyl-triethoxysilane, subsequently the above obtained silicone-polyester which contains acryloyl groups at both ends was added dropwise thereto at a temperature of 30° C. over a period of 2 hours, and further reacted at a temperature of 60° C. for one hour. After it was cooled down to 20° C., 46.1 g of butyl isocyanate was added dropwise thereto at a temperature of 60° C. for 30 minutes, subsequently 300 g of xylene was added thereto to give curable resin 4 (solids-content concentration, 60%). In the above obtained curable resin, it was recognized that infrared absorption of 1640 cm$^{-1}$ by urea bond was generated, and its number-average molecular weight by GPC method was 3000 and its amine value was 0.2.

EXAMPLE 5

An aminosilane-modified resin was prepared according to the same manner as disclosed in Example 3. A curable resin 5 (solids-content concentration, 60%) was obtained according to the process disclosed in Example 3 except that 96.3 g γ-isocyanate propyltriethoxysilane was used in place of 37.1 g of butyl isocyanate and 33.9 g of xylene was added in place of 300 g thereof. In the obtained curable resin, infrared absorption of 1640 cm$^{-1}$ by urea bond was recognized as generated, and its number-average molecular weight by GPC method was 3800 and its amine value was 0.1.

EXAMPLE 6

A reactor equipped with an agitator, a thermometer, a nitrogen-introduction pipe, a cooling pipe and a dropping funnel was charged with 84.8 g of isophoronediisocyanate (IPDI), 251.6 g of polypropylene glycol, $\overline{Mn}$ 993, and 100 g of xylene, and reacted under agitation, in nitrogen gas atmosphere at a temperature of 120° C. for 5 hours, subsequently 161.6 g of Placcel FA-4 was added thereto and reacted further at a temperature of 90° C. for another 2 hours to obtain polyether ester urethane which contains acryloyl groups at both ends.

Another reactor equipped with an agitator, a thermometer, a nitrogen-introduction pipe, a cooling pipe and a dropping funnel was charged with 65.4 g of γ-aminopropyltriethoxysilane and the above obtained polyether ester urethane which contains acryloyl group at both ends was continuously added thereto under agitation and in a nitrogen atmosphere at a temperature of 20° C. for a period one hour, and reacted further at a temperature of 60° C. for another one hour to obtain aminosilane-modified resin.

Further, 37.0 g of cycloxyl isocyanate was dropped in the reactor at a temperature of 20° C., and was further reacted at a temperature of 60° C. for 30 minutes, subsequently 300 g of xylene was added thereto to give curable resin 6 (solids-content concentration, 60%). In the obtained curable resin, infrared absorption of 1640 cm$^{-1}$ by urea bond was recognized as generated, and its number-average molecular weight by GPC method was 4500, and its amine value was 0.15.

Comparative Example 1

A reactor equipped with an agitator, a thermometer, a nitrogen-introduction pipe and a cooling pipe was charged with 50.8 g of hexamethylene diisocyanate, 346.0 g of Placcel FA-A, and 100 g of xylene, and they were reacted under agitation, in a nitrogen gas atmosphere at a temperature of 90° C. for 2 hours to give polyurethane which contains acryloyl groups at both ends (although infrared absorption of 2270 cm$^{-1}$ by NCO thereof was recognized as disappeared, absorption of 1630 to 40 cm$^{-1}$ by acryloyl group remained).

Another reactor which was equipped with an agitator a thermometer, a nitrogen-introduction pipe, a dropping funnel and a cooling pipe was charged with 140.3 g of γ-aminopropyltriethoxysilane, and the obtained polyester-urethane which contains acryloyl groups at both ends was continuously added thereto under agitation in a nitrogen gas atmosphere at a temperature of 30° C. over a period of one hour, and further reacted at a temperature of 60° C. for another one hour followed by addition of 258.1 g of xylene to give aminosilane-modified resin (solids-content concentration, 60%). In the obtained aminosilane-modified resin, infrared absorption of 1410 cm$^{-1}$ by acryloyl group was recognized as disappeared, and its number-average molecular weight by GPC method was 1700 and its amine value was 66.

Naught point five (0.5) parts of dibutyltindilaurate was added to 100 parts by weight (solids-content concentration, 60%) of a solution of each of the curable resins obtained in the Examples 1-4, and the Comparative Example 1, and the solution was diluted to an appropriate viscosity for painting, subsequently it was sprayed respectively on abrased (#400) amilac white enamel (melamine alkyd resin paint, product of Kansai Paint Co., Ltd., backed at 130° C. for 30 minutes), and on a polyethylene sheet to form a 60 μm thick film. Each sample was left to stand at normal temperature for 7 days, and then physical properties thereof were determined, the results are shown on the below table.

|  | Elongation[1] (%) | Xylene spot[2] | Adhesiveness[3] | Stability[4] |
|---|---|---|---|---|
| Example 1 | 40 | unchanged | 10/10 | >14 days |
| Example 2 | 70 | unchanged | 10/10 | >14 days |
| Example 3 | 120 | unchanged | 10/10 | >21 days |
| Example 4 | 100 | unchanged | 10/10 | >21 days |
| Example 5 | 70 | unchanged | 10/10 | >21 days |
| Example 6 | 200 | slightly delusted | 10/10 | >21 days |
| Comparative Example 1 | 80 | slightly delusted | 10/10 | <3 days |

Remarks:
[1]Each films set on the polyethylene sheet was taken off, and put to a tensile test.
[2]A few drops of xylene were dropped to effect a spot test for 10 minutes, then state of the film condition was inspected (on Amilac).
[3]A square-tape peel test (JIS-K5400) was effected (on Amilac).
[4]Each 50 cc of resin solutions synthesized respectively in the Embodiment 2 and the Comparative Example 1 was taken in a 100 cc sample tube, and left to stand open (uncovered) under the condition of 23° C. and 50% R.H., then time required for gelation thereof was observed.

EXAMPLE 7

A reactor equipped with an agitator, a thermometer, a nitrogen-introduction pipe and a cooling pipe was charged with 92.0 g of isophorne-diisocyanate (IPDI), 212.8 g of Placcel FA-4 (polycaprolactone containing acryloyl groups at both ends, $\overline{Mn}$ 230), 0.5 g of 2,6-di-t-butyl-4-methylphenol (BHT) and 100 g of xylene, then the reaction was carried out under agitation in a nitrogen gas atmosphere, at a temperature of 90° C. for 2 hours to obtain polyester-urethane which contains acryloyl groups at both ends (wherein infrared absorption of 2270 cm$^{-1}$ was recognized as disappeared, but absorption of 1630 to 40 cm$^{-1}$ remained).

Another reactor equipped with an agitator, a thermometer, a nitrogen-introduction pipe, a dropping funnel and a cooling pipe was charged with 173.8 g of γ-aminopropyltrimethoxysilane, and the polyester-urethane which contains acryloyl groups at both ends was added thereto continuously under agitation, in a nitrogen gas atmosphere, at a temperature of 20° C. over a period of one hour, and reacted at a temperature of 60° C. for another one hour to give aminosilane-modified resin. As the result of examination of thus obtained resin, infrared absorption of 1630, 1410 cm$^{-1}$ by acryloyl group was recognized as disappeared.

And further, 121.4 g of cyclohexyl isocyanate was added dropwise in the reactor at a temperature of 20° C., and reacted at a temperature of 60° C. for 30 minutes, subsequently 228 g of xylene, 60 g of isopropylalcohol, and 12 g of orthomethylacetate were added thereto to give curable resin 6 (solid-content concentration, 60%). A viscosity of the curable resin solution, thus obtained, was 50 cps at 23° C. In the obtained curable resin, infrared absorption of 1640 cm$^{-1}$ was recognized as generated, its number-average molecular weight by GPC method was 1300, and its amine value was 0.1.

Comparative Example 2

A reactor equipped with an agitator, a thermometer, a nitrogen-introduction pipe and a cooling pipe was charged with 206.6 g of isophorne-diisocyanate (IPDI), 218.6 g of Placcel 205 (polycaprolactone containing hydroxyl groups at both ends, $\overline{Mn}$ 470), and 100 g of xylene, and reacted under agitation, in a nitrogen gas atmosphere, at a temperature of 90° C. for 2 hours to obtain polyester-urethane which contains isocyanate groups at both ends. In the obtained polyester-urethane, an isocyanate titration according to di-butylamine method was recognized as remained 50% isocyanate in isophorone-diisocyanate.

Another reactor equipped with an agitator, a thermometer, a nitrogen-introduction pipe, a dropping funnel and a cooling pipe was charged with 174.8 g of γ-aminopropyltrimethoxysilane, and the above obtained polyester-urethane which contains isocyanate groups at both ends was continuously added thereto, under agitation and in a nitrogen atmosphere at a temperature of 20° C. over a period one hour, and reacted further at a temperature of 60° C. for another 30 minutes to obtain aminosilane-modified resin.

After confirming a fact that infrared absorption of 2270 cm$^{-1}$ was disappeared, 228 g of xylene, 60 g of isopropylalcohol, and 12 g of orth-methylacetate were added to obtain curable resin containing N,N'-disubstituted urea group (solids-content concentration, 60%). A viscosity of the curable resin solution was 500 cps at 23° C. In the obtained curable resin, infrared absorption of 1640 cm$^{-1}$ by urea bond was recognized as generated, and its number-average molecular weight by GPC method was 1250.

Synthetic Example

A reactor equipped with an agitator, a thermometer, a nitrogen-introduction pipe, a cooling pipe and a dropping funnel was charged with 200 g of butyl acetate and heated to 110° C. A solution in which 72 g of styrene, 23 g of n-butyl acrylate, 296 g of methylmethacrylate, 33 g of stearylmethacrylate, 47 g of γ-methacryloxypropyl-trimethoxysilane, 29 g of acrylamide, and 9 g of azobis-isobutyronitrile were dissolved in 43 g of isopropanol, was added dropwise therein, and a solution of 1 g of azobisisobutyronitrile and 80 g of butylacetate was further added dropwise for over 2 hours. A reaction of the mixture was continued at a temperature of 110° C. for one hour to obtain a vinylpolymer containing silyl group (solids-content concentration, 60%). A number-average molecular weight of the vinylpolymer containing silyl group obtained by GPC was 8000.

EXAMPLE 8

Comparative Examples 3 and 4 A physical property of a mixture composed of curable resin and vinyl resin containing silyl group A curable resin and a vinyl resin containing silyl group were mixed together according to a combination and a mixing ratio defined in Table 2 below, and adjusted a solid-content concentration of the mixture with butylacetate to 37%.

One weight part of dibutyltin-dilaurate was added to the mixture based on 100 parts of solid content of resin to form a clear paint. Several drops of the clear paint thus obtained were dropped on a glass plate.

On the other hand, a polished mild steel plate having 150 mm×70 mm×0.6 m of thickness was polished to a surface roughness #240, degreased and spray-coated with CAB alkyd resin to form CAB alkyd metallic base on the steel surface. After curing thereof at a room-temperature for 20 minutes, the clear paint was spray-coated thereover. A thickness of the coated films was 20 μm the CAB alkyd metallic base and 50 μm at the clear paint coating. After holding the steel plate at a room-temperature for 7 months, the films were tested and evaluated. The results are shown on Table 2 below.

What is claimed is:

1. A process for the preparation of a room-temperature curable resin which comprises reacting a compound (A) containing at least two acryloyl groups and/or methacryloyl groups in a molecule, and having from 100 to 100,000 of number-average molecular weight, with an aminosilane compound (B) represented by formula,

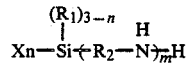

(wherein X is a hydrolyzable group selected from the group consisting of halogen, alkoxy, acryloxy, ketoxymate, amino, acid amide, aminoxy, mercapto, alkenyloxy groups; $R_1$ is a $C_1$-$C_{10}$ alkyl group, aryl group, or aralkyl group; $R_2$ is a $C_1$-$C_{10}$ bivalent alkyl group, aryl group, or aralkyl group; n is an integer of from 1 to 3, and m is an integer of from 1 to 10),
at the ratio of at least 0.2 equivalents of primary amino groups contained in the compound (B) to equivalent of acryloyl groups and/or methacryloyl groups contained in the compound (A), under substantially water-free condition, subsequently reacting the reaction product of aminosilane-modified resin and, further with a monofunctional isocyanate compound (C) represented by formula,

(wherein $R_3$ is a $C_1$-$C_{25}$ alkyl group, aryl group, aralkyl group, $(C_2H_5O)_3Si$-$(CH_2)_3$ or $(CH_3O)_3Si$-$(CH_2)_3$) at the ratio of from 0.9 to 1.5 equivalents to equivalent of active hydrogen of amino groups contained in the aminosilane-modified resin, and under substantially water-free condition to obtain a room-temperature curable resin having 2 mg KOH or lower of an amine value.

2. A process for the preparation of a room-temperature curable resin according to claim 1 wherein a main chain of the compound (A) is principally polyester.

3. A process for the preparation of a room-temperature curable resin according to claim 1 wherein a main chain of the compound (A) is principally polyether.

4. A process for the preparation of a room-temperature curable resin according to claim 1 wherein a main chain of the compound (A) is principally organopolysiloxane.

5. A process for the preparation of a room-temperature curable resin according to claim 1 wherein a main chain of the compound (A) contains urethane bond.

TABLE 2

| | Curable resin (wt part) | | Vinyl resin containing silyl group (wt part) | Viscosity Ford Cup*1 (sec) | Compatibility*2 | Xylene spot | Du Pont's impact strength*3 |
|---|---|---|---|---|---|---|---|
| Example 8 | Example 7 | 50 | Synthetic Example 1 | 50 | 20 | Clear | Slightly delusted | 500 g × 30 cm |
| Comparative Example 3 | Comparative Example 2 | 50 | Synthetic Example 1 | 50 | 50 | Haze | Slightly delusted | 500 g × 15 cm |
| Example 4 | — | | Synthetic Example 1 | 100 | 80 | Clear | Delusted | 500 g × 5 cm |

*1Viscosity is measured with Ford Cup No. 4 at 23° C.
*2Compatibility is checked and determined with naked eye inspection by observing a dried coating film on a glass plate.
*3Du Pont's impact test is conducted using ⅜ inch plunger and 500 g of weight. The weight is dropped from a certain height on the pounger which set on the surface of the film. The maximum height is recorded when the film surface is notinjured.

While the invention has been described in detail and with reference to specific embodiment thereof, it will be apparent to one skilled in the art that various changes and modifications can be made therein without departing from the spirit and scope thereof.

6. A process for the preparation of a room-temperature curable resin as claimed in claim 1 wherein the compound (B) is γ-aminopropyltrimethoxysilane.

7. A process for the preparation of a room-temperature curable resin as claimed in claim 1 wherein the compound (B) is γ-aminopropyltriethoxysilane.

8. A process for the preparation of a room-temperature curable resin as claimed in claim 1 wherein the compound (B) is N-β-(aminoethyl)-γ-aminopropyltrimethoxysilane.

9. A process for the preparation of a room-temperature curable resin according to claim 1 wherein the compound (C) is γ-isocyanatepropyltriethoxysilane.

* * * * *